No. 699,656. Patented May 13, 1902.
E. CLIFF.
HOSE RACK.
(Application filed Dec. 28, 1901.)
(No Model.)

WITNESSES:
Gustave Dieterich
Edwin R. Dieterich

INVENTOR
Edward Cliff
BY Chas. C. Gill
ATTORNEY

UNITED STATES PATENT OFFICE.

EDWARD CLIFF, OF NEWARK, NEW JERSEY, ASSIGNOR TO CLIFF AND GUIBERT COMPANY, OF NEW YORK, N. Y., A CORPORATION OF NEW YORK.

HOSE-RACK.

SPECIFICATION forming part of Letters Patent No. 699,656, dated May 13, 1902.

Application filed December 28, 1901. Serial No. 87,547. (No model.)

*To all whom it may concern:*

Be it known that I, EDWARD CLIFF, a citizen of the United States, and a resident of Newark, in the county of Essex and State of New Jersey, have invented certain new and useful Improvements in Hose-Racks, of which the following is a specification.

The invention relates to improvements in hose-racks; and it consists in the novel features and combinations of parts hereinafter described, and particularly pointed out in the claims.

My invention comprises a supporting-bar and a series of rings strung upon the hose and adapted for suspension from said bar, said rings remaining at all times upon the hose and serving, when the hose is not in use, as means for suspending the hose in folds or loops from said bar. The said rings are adapted, while supporting the hose, to be strung upon said bar and also when it is desired to use the hose to slide freely from said bar during the act of pulling the nozzle end of the hose toward the point where the occasion may render it desirable to employ the hose. In the preferred construction the supporting-bar will be pivotally secured to a bracket fastened to the wall or base, and said rings will have horizontal lower sides of a length corresponding with the width of the hose when flattened, so that the hose when suspended by the rings may fold in uniform flat layers or loops and not be creased transversely. The said rings will preferably each be formed from a rod of wire bent into shape, with an open space left between the ends of the wire to admit the passage of the hose when the latter is flattened to the inclosure formed by the ring, whereby the rings may be placed upon or removed from the hose at any time without disturbing either the nozzle at one end of the hose or the coupling at the other end thereof. The general diameter of the said rings should be sufficient to prevent the undue binding of the hose against the rings when the hose is expanded by the passage of the water through the same.

The invention and satisfactory means for carrying the same into effect will be fully understood from the detailed description hereinafter presented, reference being had to the accompanying drawings, in which—

Figure 1:
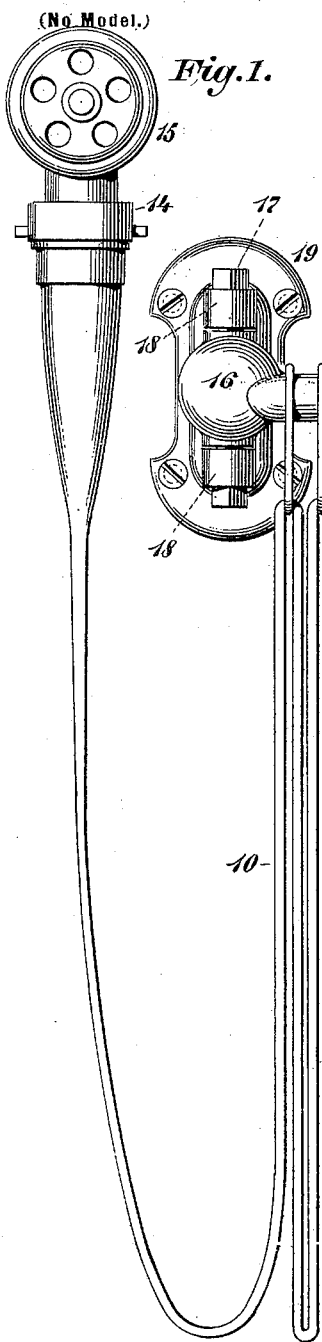
Figure 3:
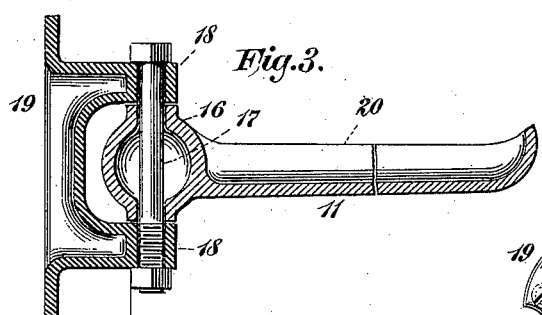
Figure 2:
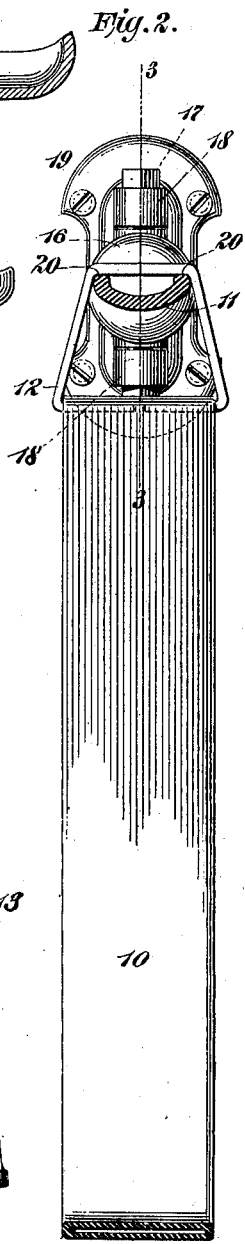
Figure 4:
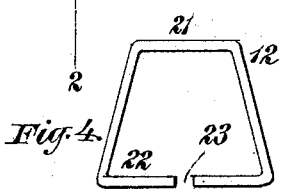

Figure 1 is a side elevation of a hose-rack constructed in accordance with and embodying the invention. Fig. 2 is a vertical section of same on the dotted line 2 2 of Fig. 1. Fig. 3 is a longitudinal section of same, partly broken away, on the dotted line 3 3 of Fig. 2; and Fig. 4 is a detached view of one of the hose-suspending rings.

In the drawings, 10 designates the hose, 11 the supporting rack-bar, and 12 the rings, which are on the hose and strung upon the bar 11 for suspending the hose in folds or loops from said bar.

The hose 10 is of usual character and is equipped at one end with the nozzle 13 and at the other end with the coupling 14, by which the hose may be connected with suitable water-supply apparatus 15.

The bar 11 will preferably be a cast bar, having the tubular bearing 16 at its shank end to freely receive the vertical bolt 17, by which said bearing 16 is secured between the ears 18 of the bracket 19, and which bolt serves to pivotally retain said bar and permit said bar to be swung or turned on horizontal radial lines, as may be required. The bracket 19 will be fastened to the wall or other base in convenient relation to the water-supply apparatus 15.

The bar 11 is grooved on its upper surface, and at the opposite edges of its upper surface presents the runways 20 20, upon which the rings 12 are hung and are adapted to move when the hose is pulled from the bar 11, said runways 20 affording the minimum amount of friction during the movement of the rings 12 upon or from said bar 11.

The rings 12 are of special importance, and the preferred outline for these rings is that illustrated in the drawings, in which it will be seen that said rings are each formed from a rod of wire bent into the form shown in Fig. 4, the upper side 21 of the rings being adapted to the width of the bar 11 and the lower side 22 of said rings being adapted to the width of the hose 10 when the latter is flattened. The sides of the ring 12 diverge from the upper side 21 to the lower side 22 of the said rings. The ends of the rod of wire from which the rings 12 are formed are separated a suitable distance to form the space 23, through which the flattened hose may be passed to the inclosure formed by the rings, and which space is preferably left in the central portion of the lower side 22 of said rings. The rings 12 will be of sufficient general diameter to avoid the binding of the rings upon the hose when the hose is filled with water, and the said rings 12 being strung upon the hose will remain on the hose at all times, both when the hose is suspended from the bar 11 as well as when the hose is in practical use. By reason of the length of the lower sides 22 of the rings 12 corresponding with the width of the hose 10 when flattened the hose is enabled to hang in uniform layers from the rings 12 and will not be creased by having its edges crowded transversely toward each other. Since the upper side 21 of the rings 12 substantially correspond in length with the width of the bar 11, the said rings will be uniformly suspended by said bar 11 and will be supported in a manner causing the folds of the hose 10 to hang evenly and neatly without undue straining of said rings. I do not limit my invention to the exact form of ring 12 shown in Fig. 4; but I find that in practice the special shape of ring 12 shown in Fig. 4 may be used with entire satisfaction.

When the hose 10 is not in use, it will be suspended by means of the rings 12 from the bar 11 in the manner illustrated in Fig. 1, and when it is desired to employ the hose 10 the attendant will grasp the nozzle 13 and pull the same in the direction of the fire. The act of pulling on the nozzle end of the hose will cause the rings 12 one after another to slide from off the bar 11, said rings following one another in rapid succession and with substantially no exertion on the part of the attendant.

One great advantage of the invention is that the rings 12 will have no tendency whatever to bind upon the bar 11, but will freely slide therefrom with the minimum amount of friction and without calling for any special exertion on the part of the attendant.

Another advantage due to the present invention is that the rings 12 remain at all times upon the hose, and hence the rings 12 never become lost, mislaid, or misplaced.

A further feature of advantage due to the present invention is that the rings may be placed upon the hose at any time without disturbing the nozzle 13 or coupling 14, since the rings 12 are split rings and may be passed transversely upon the hose 10 when the latter is flattened.

The bolt 17 operates as a pivotal support for the bar 11, and hence the bar 11 may normally lie close against the adjacent wall or may be turned outward at an angle thereto. The lower end of the bolt 17 is threaded to receive the nut, and the inner walls of the bearing 16 and ears 18 present smooth surfaces to the exterior surfaces of said bolt 17.

What I claim as my invention, and desire to secure by Letters Patent, is—

1. The hose-rack comprising the supporting-bar secured at one end and free at the other end, and the series of rings for suspending the hose in folds or loops from said bar, said rings being freely strung upon the hose so as to be movable thereon and adapted while on the hose to pass upon and hang from said bar and suspend the folded hose, and said rings being of sufficient diameter to permit the expansion therein of the hose when the latter is in use; substantially as set forth.

2. The hose-rack comprising the supporting-bar, and the series of rings strung upon the hose for suspending the latter in folds or loops from said bar, said rings being adapted while on the hose to pass upon and hang from said bar and suspend the folded hose, and said rings being split to admit the flattened hose into the inclosure formed by the rings; substantially as set forth.

3. The hose-rack comprising the supporting-bar, and the series of rings strung upon the hose for suspending the latter in folds or loops from said bar, said rings being adapted while on the hose to pass upon and hang from said bar and suspend the folded hose, and said rings having substantially horizontal lower sides of a length corresponding with the width of the hose when the latter is flattened; substantially as set forth.

4. The hose-rack comprising the supporting-bar, and the series of rings strung upon the hose for suspending the latter in folds or loops from said bar, said rings having the substantially horizontal lower sides of a length corresponding with the width of the hose when the latter is flattened, and said lower sides at about their central portion being split to admit the hose into the inclosure formed by the rings; substantially as set forth.

5. The hose-rack comprising the horizontal bar having the longitudinal runways at the opposite edges of its upper surface, and the bracket to which said bar is pivoted, combined with the series of rings strung upon the hose for suspending the latter in folds or loops from said bar, the upper sides of said rings being adapted to said runways and the lower sides of said rings being adapted to hold the flattened hose; substantially as set forth.

6. The hose-rack comprising the supporting-bar, and the series of rings upon the hose for supporting the latter in folds or loops from said bar, said rings at their upper sides substantially corresponding with the width of said bar and at their lower sides substantially corresponding with the width of the hose when flattened; substantially as set forth.

Signed at New York, in the county of New York and State of New York, this 26th day of December, A. D. 1901.

EDWARD CLIFF.

Witnesses:
CHAS. C. GILL,
ARTHUR MARION.